Sept. 27, 1955     R. D. SMITH     2,718,913
MOTOR CAR SERVICE MECHANISM
Filed April 23, 1951     3 Sheets-Sheet 1
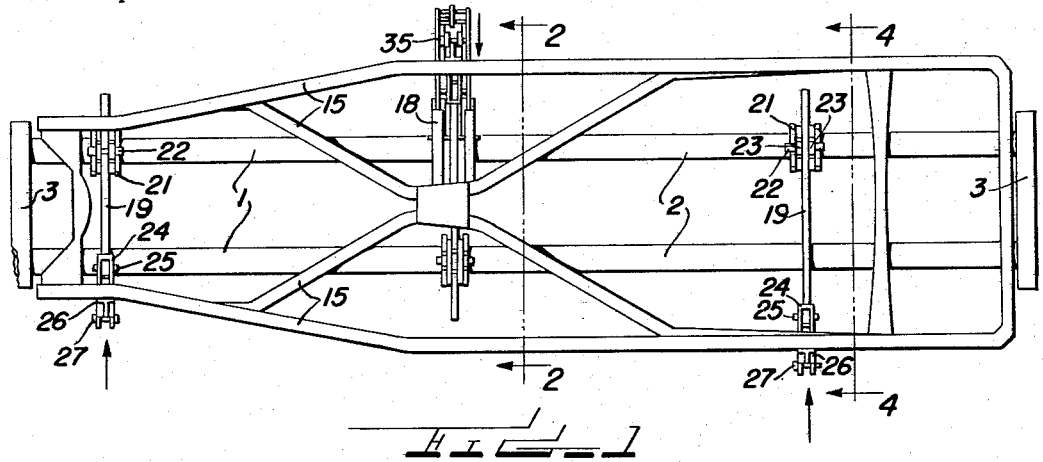
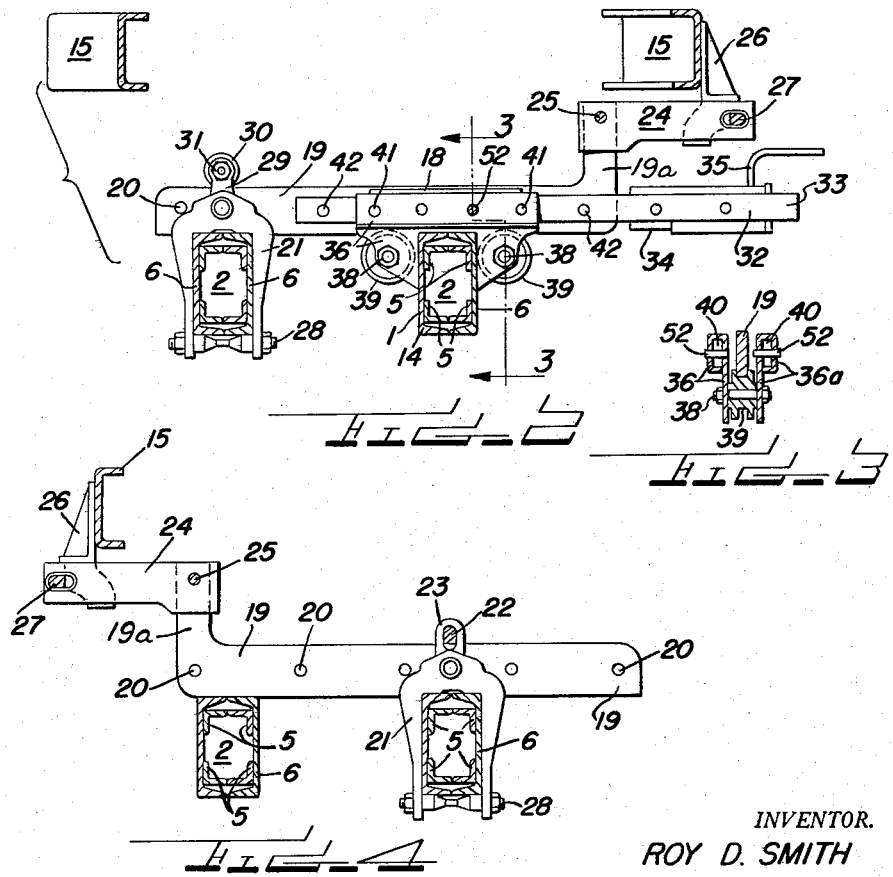
INVENTOR.
ROY D. SMITH
BY
Merrill M. Blackburn
ATTORNEY Sept. 27, 1955 R. D. SMITH 2,718,913
MOTOR CAR SERVICE MECHANISM
Filed April 23, 1951 3 Sheets-Sheet 2

INVENTOR.
ROY D. SMITH
BY
Merrill M. Blackburn.
ATTORNEY

Sept. 27, 1955 R. D. SMITH 2,718,913
MOTOR CAR SERVICE MECHANISM
Filed April 23, 1951 3 Sheets-Sheet 3
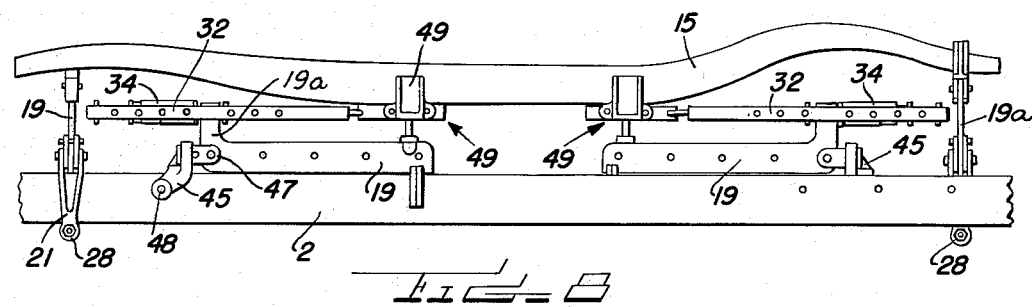
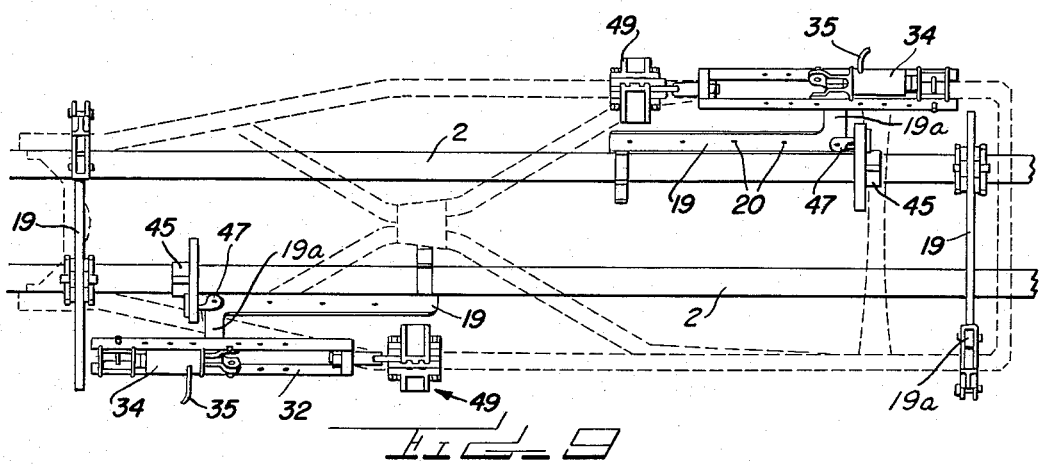
INVENTOR.
ROY D. SMITH
BY
ATTORNEY

United States Patent Office 2,718,913
Patented Sept. 27, 1955

2,718,913

MOTOR CAR SERVICE MECHANISM

Roy D. Smith, Fort Worth, Tex., assignor to Bee-Line Company, Davenport, Iowa, a copartnership Application April 23, 1951, Serial No. 222,305

10 Claims. (Cl. 153—32)

My present invention relates to mechanism usable in checking the parts of motor cars and operating thereon to correct errors of form or adjustment. Among the objects of this invention are the provision of improved mechanism for performing the work intended; the provision of an apparatus of the type indicated of improved safety mechanism; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof;

Fig. 1 represents, in plan view, a motor vehicle frame superposed upon the holding device for certain implements for operating upon said frame;

Fig. 2 represents a cross-section substantially along the plane indicated by the line 2—2, Fig. 1;

Fig. 3 represents a transverse section substantially along the broken plane indicated by the line 3—3, Fig. 2;

Fig. 4 represents a cross-section substantially along the plane indicated by the line 4—4, Fig. 1;

Figure 5:
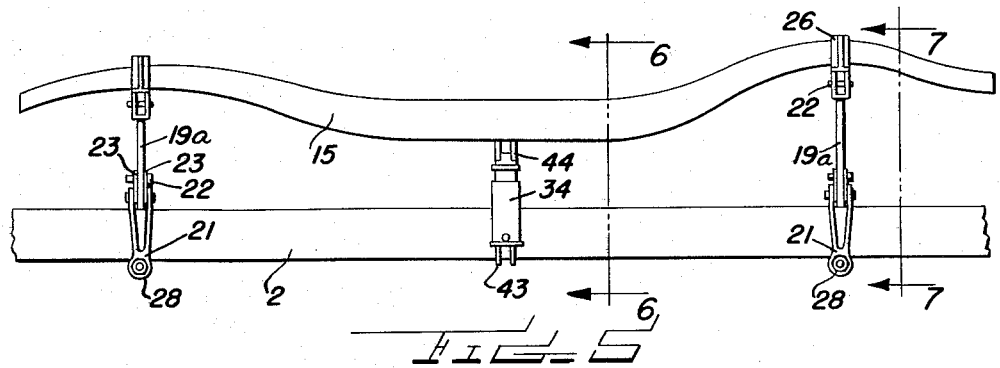
Fig. 5 represents, in side elevation, a part of the frame-correction mechanism and a side frame member of a motor vehicle.
Figure 6:
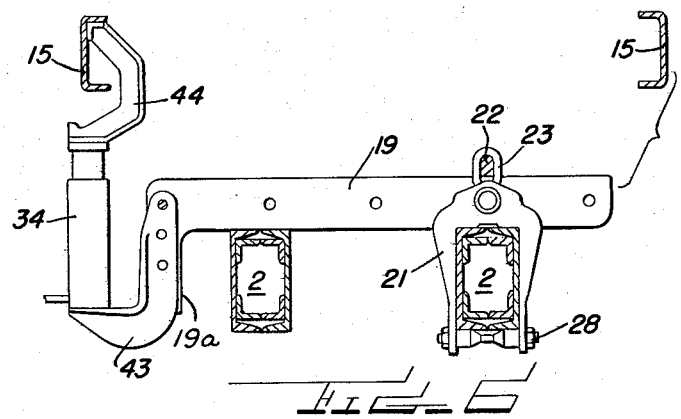
Figure 7:
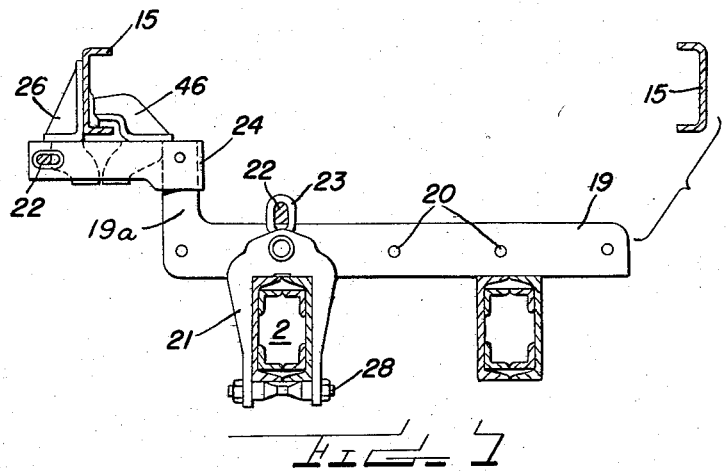

Figs. 6 and 7 represent, respectively, transverse sections substantially along the planes indicated by the lines 6—6 and 7—7, Fig. 5; and Figs. 8 and 9 represent, respectively, side elevation and plan view of a frame-correcting mechanism, with a frame superimposed thereon.

The implement-supporting unit 1 comprises a pair of work or strain resisting beams 2, cross members 3 connecting the ends of these beams, and pivoted end frames 4 by means of which the respective ends of the frame 1 may be independently raised. As shown in Figs. 2, 4, 6, and 7, these beams 2 are made up of a plurality of angle members 5 enclosed between channels 6 which are secured together facing each other. This makes a very strong and comparatively light means for holding the working members. This is quite necessary because of the great strain which is placed upon these beams during use of the machine. Since the two sides of this machine are similar, the structure of one side will be given and it will be understood that the same description applies to both sides.

For a description of the tools to be used with the tool-holding frame 1 and the operation thereof, reference will now be made in greater detail to the annexed drawings. In order to avoid confusion, only the frame of an automobile is shown and, in Fig. 9, this is shown in broken lines. The beams 2 of the tool-holding frame 1 are not shown in any detail in Fig. 1 but the detail is shown in cross-section in Figs. 2 and 4. The motor vehicle frame is indicated at 15 and tool-holding units or bars 19 are shown in Fig. 1 as holding the front and rear portions of the frame against lateral movement when pressure is applied to the middle portion by the guiding unit 18. The units 19 may be identical but are shown as being of two different lengths, although otherwise identical. The construction of these two units is shown in Fig. 4, while the construction of guiding unit 18 is shown in Fig 2.

The bar 19 is shown as being rectangular in construction and as being provided with a plurality of holes 20 and an angular projection 19a. A clevis or guiding means 21 surrounds one of the beams 2 and has a notch in the top thereof for reception of the bar 19. A tapered pin 22 is passed through a pair of ears 23 connected to the clevis or guiding means 21 and draws the latter into tight holding engagement with the bar 19. Therefore, an endwise pull on this bar will not cause the same to slip relatively to the beam 2 but the pulling force will be transmitted to the beam. A loop or link 24 is connected to an end portion of the bar 19 by means of a pin 25 and has an abutment member 26 extending through the opposite end thereof and held in place by means of a taper pin 27. This gives a rigid connection between the loop 24 and the abutment member 26 which engages one of the frame members 15 of the motor vehicle. A pin 28 extends through the legs of the clevis or guiding means 21 and fixedly connects the same to the beam 2.

While the structure shown in Fig. 2 is the same in certain respects as that shown in Fig. 4, in other respects it differs therefrom. In the structure shown in Fig. 2, ears 23, as shown in Fig. 4, are replaced by ears 29 having a roller 30 connected thereto by a pivot 31. This enables the bar 19 to slide longitudinally with respect to the beam 2. An elongated U-shaped yoke 32 has its closed end 33 located some distance from the bar 19, and between this closed end 33 and the angle of the bar is located a jack 34 which may be supplied with power through the pipe 35.

There is a frame, made up of two parts 36 and 36a, connected by bolts 38, on which are mounted grooved pulleys 39. The bar 19 rests in the grooves of these pulleys and is slidable transversely of the beams 2 under pressure by the jack 34. As shown in Fig. 3, the frame members 36 and 36a have openings 40 therethrough, through which the arms of the yoke 32 are passed and in which they may be adjusted. These frame members have openings 41 through which pins 52 may be passed. The arms of the yoke 32 also have openings 42 which may be aligned with the openings 41 making it possible to pass the pins through openings 41 and 42, thereby connecting the yoke 32 and the members 36 and 36a, thus preventing relative sliding of these parts. These pins 52 do not pass through the bar 19 and therefore it may slide relatively to the parts 32 and 36, see Figs. 2 and 3. This will cause movement of frame member 15 relatively to the correction beam 2, resulting in bending thereof, a necessary frame correction in certain instances. The relationship of the structures of Figs. 2 and 4 is shown in Fig. 1. The direction of the forces is indicated in Fig. 1 by the arrows at the sides of the frame.

In Fig. 5 there is illustrated the operation of eliminating frame sag. In this operation, a pair of clevises or guiding means 21 are located upon opposite sides of the bend which is to be corrected, being connected by suitable hooks and links to the car frame members 15. As shown in Fig. 6, a hook 43 is connected to the short arm of a bar 19 and serves as a support for a jack 34. A correction tool 44 rests on the jack ram and pushes upwardly on the upper flange of frame member 15, causing bending of this frame member, as will be evident from Fig. 5.

In the operation illustrated in Fig. 7, links 24 are connected to the short arm of bar 19 and have an abutment member 26 held in place between them by a pin 22. An abutment 46 engages in the channel of the frame member 15 and has its second end located between the links 24. By reference to Fig. 5, it will be seen that the holding force exerted by this unit is directed downwardly, the force of the jack being directed upwardly.

In Figs. 8 and 9 there is illustrated the operation of eliminating what is known in the art as "diamond frame." Abutments 45 are connected to the beams 2 and by links 47 to the bars 19. The abutments 45 are held against longitudinal motion by pins 48, passing through these abutments and cooperating holes in the beams 2. (See Fig. 8.) Clamps 49 grip the frame members 15 and, being connected to the pulling members 32, transmit force from the jacks 34 to the frame members. The pulling units being connected to the two frame members of the car which are held against any lateral movement, the pulling force causes the frame members to move longitudinally relatively to each other, resulting in a change in the angular relation of the parts of the vehicle frame.

It will of course be understood that the specific structure described above may be departed from without departing from the spirit of this invention as set forth herein and in the appended claims.

Having now described my invention, I claim:

1. In a frame-straightening apparatus, a tool-holding beam comprising a pair of channel irons facing each other with an approximately rectangular elongated space between them, and elongated angle irons within said space, arranged in the angles thereof and secured therein to the inner corner portions of said channel irons.

2. In a frame straightening apparatus for vehicle frames, the combination of a pair of strain-resisting beams, each fabricated from channel irons and inserted angle irons, a clevis surrounding one of said beams and secured thereto, a force-transmitting bar secured in said clevis and resting on the second beam, said bar having one end extending outwardly edgewise at substantially a right angle to the body of the bar, a link connected to the outwardly extending end of the bar, an abutment detachably connected to said link but rigidly held thereto in a position to engage a member of a vehicle frame, and force-exerting means connected with the other of said strain-resisting beams and a member of the vehicle frame, whereby the latter may be straightened.

3. In a frame straightening apparatus for vehicle frames, the combination of a work beam fabricated from angle irons, guiding means to rest on and engage opposite sides of the work beam, the opposite sides of said guiding means having channels therein extending transversely of the work beam, a U-shaped force-transmitting member having its arms adjustable in the channels, a second force-transmitting member slidable through and guided by said guiding means, said second force-transmitting member having an end turned at a right angle to the body thereof, means for connecting said end to a beam to be bent, and a jack between the closed end of the U-shaped force-transmitting member and the angle of the second force-transmitting member.

4. In a frame-straightening apparatus for vehicle frames, the combination of a pair of strain-resisting beams placed side by side, in parallel but spaced apart relation, a pair of anchoring members connected with one beam, extending across in contact with the other beam and connected with the frame member at the side of said frame, substantially opposite said one beam, and a force-exerting unit connected in anchored relation to said other beam, between said anchoring members, extending across in contact with said one beam and connected with a frame member at the side of said frame, substantially opposite said other beam.

5. In a frame-straightening apparatus for vehicle frames, a strain-resisting work beam, guiding means carried by said beam and including channels extending transversely of the work beam, a U-shaped force-transmitting member having its arms adjustable in the channels, a second force-transmitting member slidable through and guided by said guiding means, said second force-transmitting member having an end turned at a right angle to the body thereof, means connecting said end to the frame portion to be straightened, said means extending under the latter and over the adjacent portion of said U-shaped member, and a jack under said connecting means and acting between the closed end of said U-shaped force-transmitting member and the adjacent portion of said second force-transmitting member.

6. In a frame-straightening apparatus for vehicle frames, a strain-resisting work beam, guiding means carried by said beam and including channels extending transversely of the work beam, a U-shaped force-transmitting member having its arms adjustable in the channels, a second force-transmitting member slidable through and guided by said guiding means, means connecting said second member with the frame section to be straightened, and a jack between the closed end of said first member and said second member, and connected therewith to move one relative to the other.

7. In a frame-straightening apparatus for vehicle frames, the combination of a pair of strain-resisting beams placed side by side, in parallel but spaced apart relation, means for exerting an approximately vertically directed force against an associated frame section, comprising an anchoring member extending across and in contact with both beams, means connecting one end portion of said anchoring member with one of said beams, the other end extending across and beyond the other beam, and a jack connected with the extended end portion of said anchoring member and extending upwardly into connection with the adjacent portion of the frame to be straightened.

8. The invention as set forth in claim 7, further characterized by a depending bracket secured to the other end of said anchoring member, and means on said bracket to receive said jack.

9. In a frame-straightening apparatus for vehicle frames, the combination of a pair of strain-resisting beams placed side by side, in parallel but spaced apart relation, a pair of anchoring members extending along said beams, means connecting one end of each anchoring member to the associated beam, the other ends of said anchoring members extending along said beams in a direction toward one another, a pair of force-transmitting members connected with opposite portions of the frame to be straightened and made substantially parallel to said anchoring members, means connecting one of said force-transmitting members to the associated anchoring member, and a force-exerting jack connected between the other anchoring member and the other force-transmitting member.

10. The invention as set forth in claim 9, further characterized by said connecting means comprising a second jack.

References Cited in the file of this patent

UNITED STATES PATENTS

| | | |
|---|---|---|
| 824,550 | Lazerges | June 26, 1906 |
| 1,037,099 | York | Aug. 27, 1912 |
| 2,004,907 | Wallen et al. | June 11, 1935 |
| 2,348,697 | Smith | May 9, 1944 |
| 2,442,425 | Merrill et al. | June 1, 1948 |
| 2,482,738 | Smith | Sept. 20, 1949 |

FOREIGN PATENTS

| | | |
|---|---|---|
| 21,680 | Sweden | July 1, 1905 |
| 856,010 | France | Mar. 4, 1940 |